United States Patent
Graf et al.

(10) Patent No.: US 6,561,316 B1
(45) Date of Patent: May 13, 2003

(54) DEVICE FOR LUBRICATING A ROLLING BEARING

(75) Inventors: Walter Graf, Euerdorf (DE); Anton May, Burkhardroth (DE); Ralf Albert, Poppenhausen (DE); Peter Fenn, Sulzthal (DE); Armin Brand, Bad Kissingen (DE)

(73) Assignee: Perma-Tec GmbH & Co. KG, Euerdorf (DE)

( * ) Notice: Subject to any disclaimer, the term of this patent is extended or adjusted under 35 U.S.C. 154(b) by 0 days.

(21) Appl. No.: 09/856,364
(22) PCT Filed: Oct. 2, 2000
(86) PCT No.: PCT/EP00/09632
§ 371 (c)(1),
(2), (4) Date: May 18, 2001
(87) PCT Pub. No.: WO01/25678
PCT Pub. Date: Apr. 12, 2001

(30) Foreign Application Priority Data

Oct. 2, 1999 (DE) .......................................... 199 47 458

(51) Int. Cl.⁷ .............................. F16N 13/08; F16N 3/12
(52) U.S. Cl. .................... 184/38.4; 184/105.1; 384/462
(58) Field of Search .............................. 184/38.2, 38.3, 184/38.4, 105.1, 105.2; 384/369, 373, 377, 398, 399, 400, 462, 473, 624

(56) References Cited

U.S. PATENT DOCUMENTS

| | | | | |
|---|---|---|---|---|
| 1,449,934 A | * | 3/1923 | Becker | 184/38.1 |
| 2,031,671 A | * | 2/1936 | Rising | 141/383 |
| 5,439,296 A | * | 8/1995 | El-Ibiary | 384/448 |
| 5,634,531 A | | 6/1997 | Graf et al. | |
| 5,878,842 A | * | 3/1999 | Rake | 184/108 |
| 6,339,961 B1 | * | 1/2002 | Goodman et al. | 184/105.2 |
| 6,374,950 B1 | * | 4/2002 | Takeno | 184/7.4 |
| 6,408,985 B1 | * | 6/2002 | Orlitzky et al. | 184/105.2 |

FOREIGN PATENT DOCUMENTS

| | | |
|---|---|---|
| DE | 297 15 808 U1 | 12/1997 |
| EP | 0 247 398 A1 | 12/1987 |
| EP | 0 704 654 A1 | 4/1996 |
| EP | 0 931 974 A1 | 7/1999 |
| EP | 0 933 581 A1 | 8/1999 |

* cited by examiner

*Primary Examiner*—David Fenstermacher
(74) *Attorney, Agent, or Firm*—Herbert Dubno

(57) ABSTRACT

A device for lubricating a rolling bearing. The inventive device comprises a lubricant dispenser (1) connected to the lubricating point of the rolling bearing (7) and a measuring unit (8) allocated to the rolling bearing (7) for detecting the condition of the bearing. The lubricant dispenser (1) comprises a lubricant container with a supply of lubricant (2), a discharge device with an electromotor drive (3) and a control device (4) lined with the measuring device (8). The control device (4) of the lubricant dispenser (1) emits control signals to the electromotor drive (3) at certain intervals prompting it to discharge small amounts of lubricant and changes the discharge times and/or the duration of the discharge intervals if the measuring signal emitted by the measuring unit (8) exceeds a defined value. In this case, a signal for displaying an incipient bearing defect is also emitted.

7 Claims, 1 Drawing Sheet

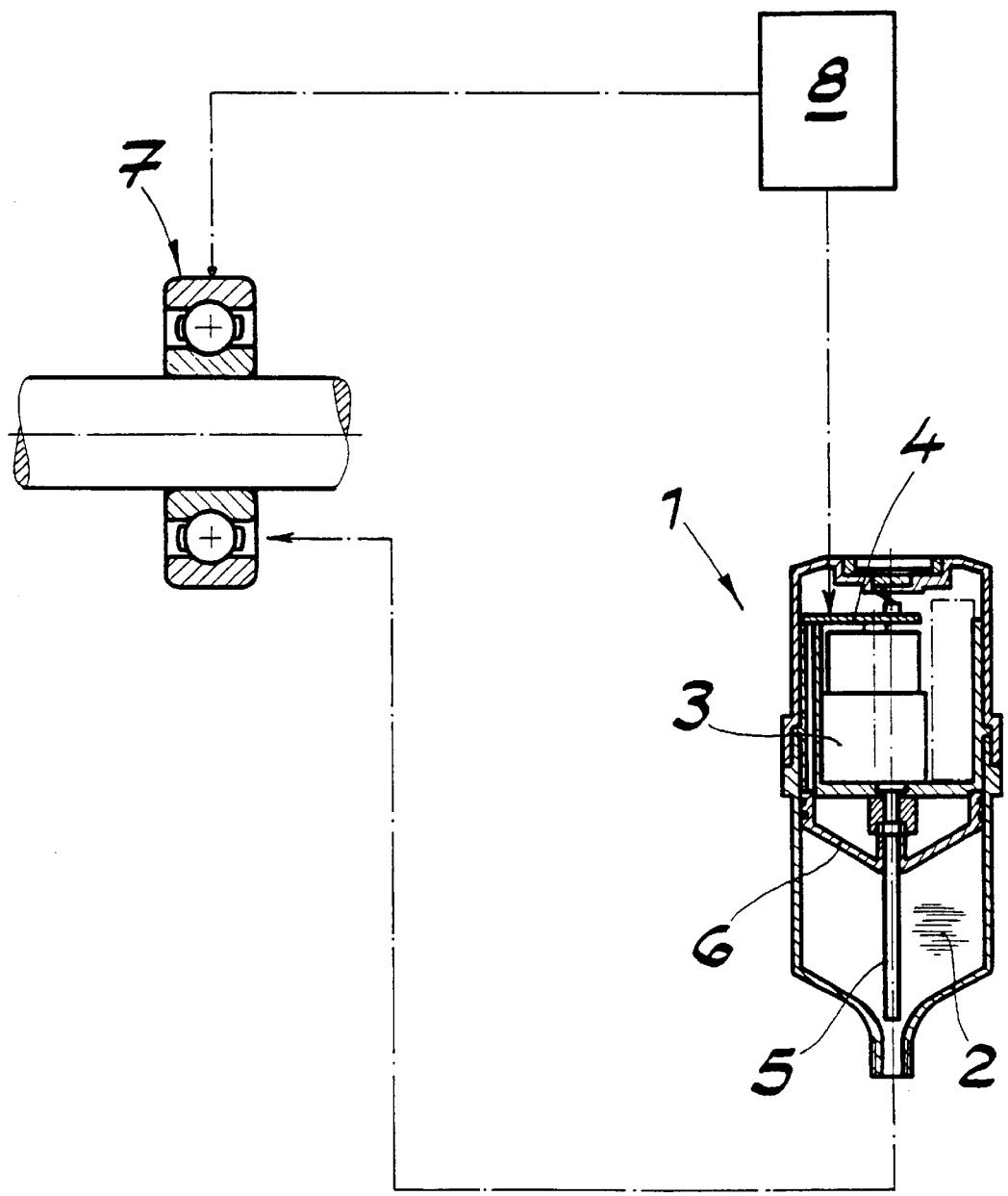

DEVICE FOR LUBRICATING A ROLLING BEARING

CROSS REFERENCE TO RELATED APPLICATIONS

This application is a national stage of PCT/EP00/09632 filed Oct. 2, 2000 based upon German national application 199 47 458.3 of Oct. 2, 1999 under the International Convention.

FIELD OF THE INVENTION

The invention relates to an apparatus for lubricating a roller bearing.

BACKGROUND OF THE INVENTION

Lubrication dispensers are known which automatically supply lubricant over a predetermined adjustable interval of for example one to twelve months. Precise metering of the lubricant is possible especially with lubricant dispensers which have a lubricant container with a supply of lubricant, a feeding device with an electric motor drive and a control device for the electric motor. Such a lubricant dispenser is known for example from DE-A 44 22 407.

Monitoring systems are known for an on-line roller bearing monitoring by means of which the roller bearing state can be measured during the machine operation and evaluated. Based upon the trends of the roller bearing condition, maintenance requirements can be predicted in advance and effectively carried out. The measuring device of a monitoring system known in practice has a multiplicity of measurement channels for measurement pickups and is associated with a computer in which, with corresponding software, the measured values are evaluated and the roller bearing state displayed. Monitoring systems of this type are expensive. The results of the analysis must be regularly observed. For operation of the system with the software, skilled personnel are required.

Upon incipient roller bearing damage which can be established by inspection or with the aid of a state monitoring system as has been described previously, the roller bearing can be replaced immediately or at a planned point in time in the course of maintenance. This had no effect on the setting of the lubricant dispenser.

OBJECTS OF THE INVENTION

The invention has as its object the provision of an apparatus for lubricating a roller bearing without connections to a central roller bearing monitoring system which enables a condition-oriented maintenance. The apparatus should for this apparatus recognize an incipient bearing defect or a faulty lubrication state and delay by appropriate additional lubrication the course of deterioration so that the bearing replacement can be planned in the framework of maintenance work over a longer period.

SUMMARY OF THE INVENTION

The subject of the invention and the solution to the problem addressed by the object is an apparatus for lubricating a roller bearing comprised of 1.1) a lubricant dispenser which has a lubricant container with a supply of lubricant, a feed device with an electric motor drive and a control device for the electric motor drive and which is connected to the lubrication point of a roller bearing, and 1.2) a measuring device associated with the roller bearing for detecting the bearing condition and which is connected with the control device of the lubricant dispenser, whereby the control device of the lubricant dispenser provides switching pulses at intervals to the electric motor drive to supply small lubricant quantities and whereby the control device varies the dispensing time point and/or duration of the dispensing interval and delivers a signal to indicate an incipient bearing defect or a faulty lubrication condition when the measuring signal outputted by the measuring device exceeds a predetermined value.

The bearing condition of the roller bearing is detected by measurement technology. The measurement signal is fed to the control device of the lubricant dispenser and is evaluated by it. The control device varies the lubricant supply rate by changing the dispensing time points and/or the duration of the dispensing intervals automatically and produces a signal to indicate the commencement of a bearing defect or a faulty lubrication condition when the measurement signal exceeds a predetermined value which is characteristic of an incipient bearing defect or a faulty lubrication state.

According to the invention, the lubrication feeding rate is automatically increased (i.e. additional lubrication is provided) as soon as the measurement devices detect an incipient bearing defect or a faulty lubrication condition. The amount of the appropriate additional lubrication can be established by appropriate tests. The additional lubrication can remain constant over a long time period or can be varied in accordance with a predetermined time profile of the control device of the lubricant dispenser.

The measuring device can preferably be a temperature sensor and/or a device for measuring the quiescence of the roller bearing. It can, for example, carry out a vibration measurement or a noise measurement at a bearing. The measuring device can also have a shock pulse pickup and a sensor for measuring the shaft speed. The shock pulse measurement in combination with information as to the speed enables convenient monitoring of the roller bearing. It is realizable in a technologically simple manner and in accordance with the teaching of the invention and is appropriate for combination with a lubricant dispenser.

According to a further advantageous refinement of the apparatus of the invention the control device has setting means or an interface for a roller bearing specific configuration of a control program stored in the control device by means of which the bearing condition monitoring and/or determination of the dispensing time points or dispensing intervals are carried out upon determination of a roller bearing defect or determination of a lubricating condition deficiency. The configuration can be effective in terms of the operation or configuration of the apparatus by means of a PC which can be connected with a terminal of the apparatus and after such configuring can be again separated from the apparatus. In the framework of the invention, the control device may be equipped with selector switches for inputting roller bearing specific data.

The lubricant dispenser has a housing which advantageously is equipped with a display device, for example, with a colored light diode (LED) for displaying a laser defect signal. The control device can in addition have an interface for a remote signal transmitter. The remote signal transmission can be wired or wireless.

If a detected bearing defect, in spite of the additional lubrication in accordance with the invention, advances and the measurement signal of the measuring device associated with the roller bearing exceeds a permissible limiting value for a defective bearing, according to a preferred further refinement of the invention, the control device outputs an optical or acoustic noise or danger signal.

BRIEF DESCRIPTION OF THE DRAWING

The sole FIGURE of the drawing is a diagram of an apparatus according to the invention

SPECIFIC DESCRIPTION

The core of this apparatus is a lubricant dispenser 1 which has a lubricant container with a supply of the lubricant 2, a feed device with an electric motor drive 3 and a control device 4 for the electric motor drive 3. In the embodiment shown, the feed device has a spindle 5 connected with the drive 3 and a piston 6 movable by the spindle 5. The lubricant dispenser 1 is connected to the lubricating point of a roller bearing 7. The control device 4, which in the Figure has been shown as a printed circuit board, outputs switching pulses to the electric motor drive 3 at intervals to feed small lubricant quantities. Usually the dispensing time points and lubricant intervals, and thus the duration of the lubricant outputted at certain dispensing time points, is so established that the lubricant supply will be discharged over a period of several months.

The apparatus has, in addition, a measuring device 8 associated with the roller bearing 7 for detecting the bearing condition and which is connected with the control device 4 of the lubricant dispenser 1. As the measuring device 8, a temperature measuring device at the roller bearing, for example, is suitable for the measuring device which can also have a shock pulse pickup in conjunction with a sensor for measuring the shaft speed. When the measurement signal exceeds a predetermined value which is characteristic of an incipient bearing failure of a deficient lubrication condition, the lubricant feed rate is increased by varying the dispensing time points and/or the duration of the dispensing interval. For that purpose the control device 4 is equipped with a correspondingly programmed control chip. In addition, a signal for indicating an incipient bearing defect is outputted. The housing of the lubricant dispenser is equipped with an indicating device for the signal, for example, in the form of a colored light diode (LED). In addition, the control device 4 can have an interface for a wired or wireless signal remote transmitter.

What is claimed is:

1. A self-contained apparatus for lubricating a roller bearing, comprised of 1.1) a lubricating dispenser (1) which has a housing formed with a lubricant container with a supply of lubricant (2), a discharge device with an electric motor drive (3) and a control device (4) in the housing for the electric motor drive (3) and which is connected to the lubricating point of a roller bearing (7), and 1.2) a measuring device (8) associated with the roller bearing (7) for detecting the bearing condition and which is connected with the control device (4) of the lubricant dispenser (1), the housing being equipped with an indicating device for a signal indicating a bearing defect, the control device (4) of the lubricating dispenser (2) applying at intervals switching pulses to the electric motor drive (3) to output a small lubricant quantity and whereby the control device (4) changes the dispensing time points and/or the duration of the dispensing interval to automatically increase a lubrication feeding rate, the central device delivering a signal to the indicating device for signaling an incipient bearing defect or a lubricant condition deficiency when the measurement signal outputted by the measuring device (4) exceeds a predetermined value.

2. The apparatus according to claim 1 wherein the measuring device (8) has a temperature sensor and/or a device for measuring the quiescence of running of the roller bearing.

3. The apparatus according to claim 1 wherein the measuring device (8) has a shock pulse pickup and a sensor for measurement of the shaft speed.

4. The apparatus according to claim 1, wherein characterized in that the control device (4) has adjusting means for an interface for a roller bearing specific configuration of a control program stored in the control device which determines a bearing condition monitoring and/or the establishment of the dispensing time points or dispensing interval for determined roller bearing defects or determined fault lubricant states.

5. The apparatus according to claim 4, wherein the indicating device is comprised of at least one colored light diode (LED).

6. The apparatus according to claim 5 wherein the control device (4) has an interface for a wired or wireless remote signal transmission.

7. The apparatus according to claim 5, wherein the control device (4) outputs a noise signal when the measuring signal of the measuring device (8) associated with the roller bearing (7) exceeds an allowable limit for a damaged bearing.

\* \* \* \* \*